United States Patent
Hall

[15] 3,690,490
[45] Sept. 12, 1972

[54] TRAILER CONSTRUCTION
[72] Inventor: Harry P. Hall, Franklin, Tenn.
[73] Assignee: Diversified Metals, Inc., Smyrna, Tenn.
[22] Filed: Jan. 12, 1971
[21] Appl. No.: 105,910

[52] U.S. Cl..................................214/506, 214/85
[51] Int. Cl...............................B60p 1/28, B60p 3/10
[58] Field of Search......214/505, 506, 83.24, 501, 85

[56] References Cited

UNITED STATES PATENTS

| | | | |
|---|---|---|---|
| 3,430,792 | 3/1969 | Grove et al. | 214/505 |
| 3,485,400 | 12/1969 | Pewthers | 214/505 |
| 3,071,267 | 1/1963 | Bunch | 214/505 |

FOREIGN PATENTS OR APPLICATIONS

| | | | |
|---|---|---|---|
| 726,877 | 3/1932 | France | 214/505 |

*Primary Examiner*—Albert J. Makay
*Attorney*—Mason, Fenwick & Lawrence

[57] ABSTRACT

A trailer construction is provided in which a load supporting platform frame is shiftable rearwardly with respect to a supporting axle while its rearmost edge is pivoted downwardly to provide a resultant small angle of inclination between the platform frame and the ground surface to enable an easy movement of material to and from the platform frame and to serve as a stationary loading ramp.

3 Claims, 8 Drawing Figures

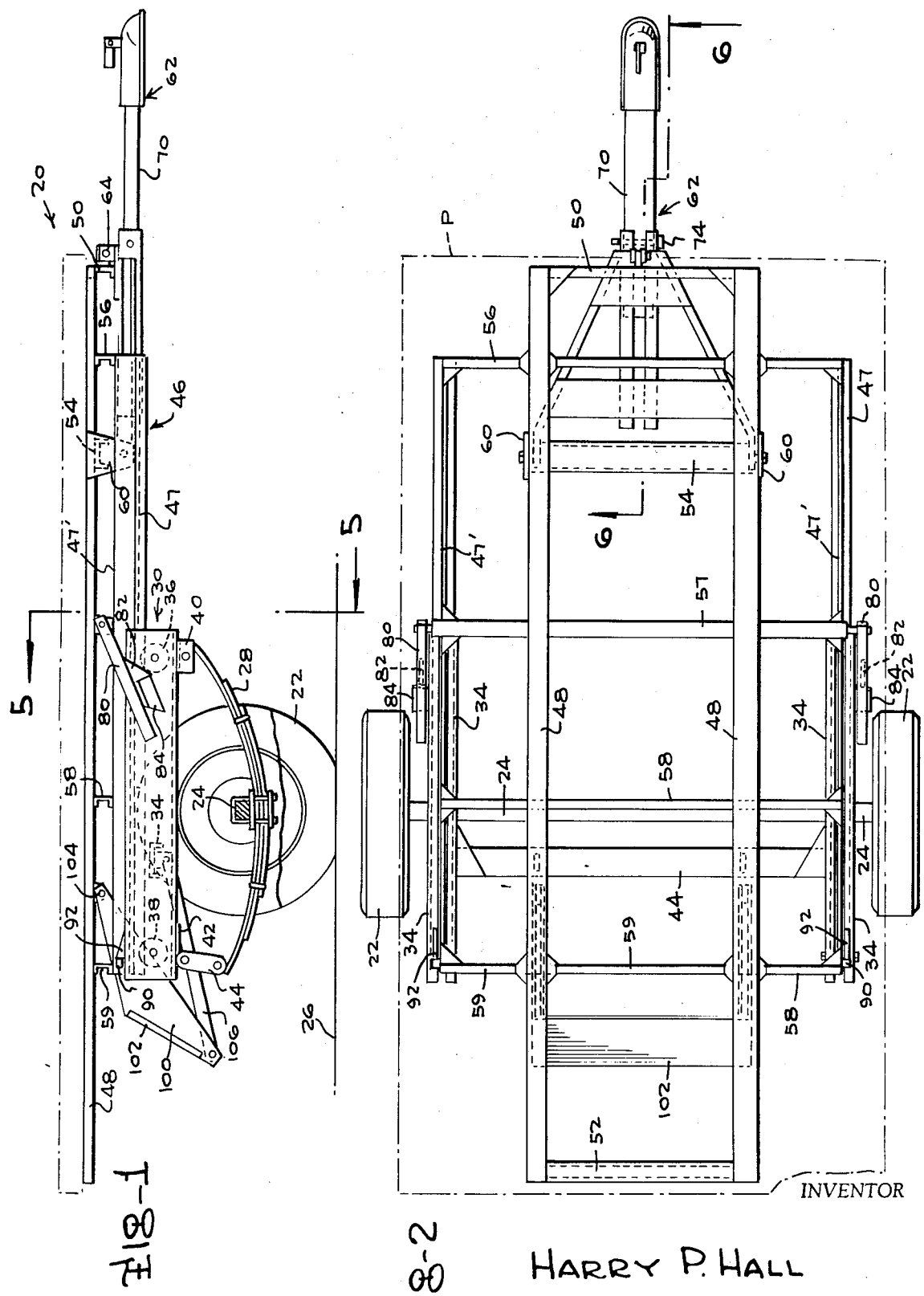

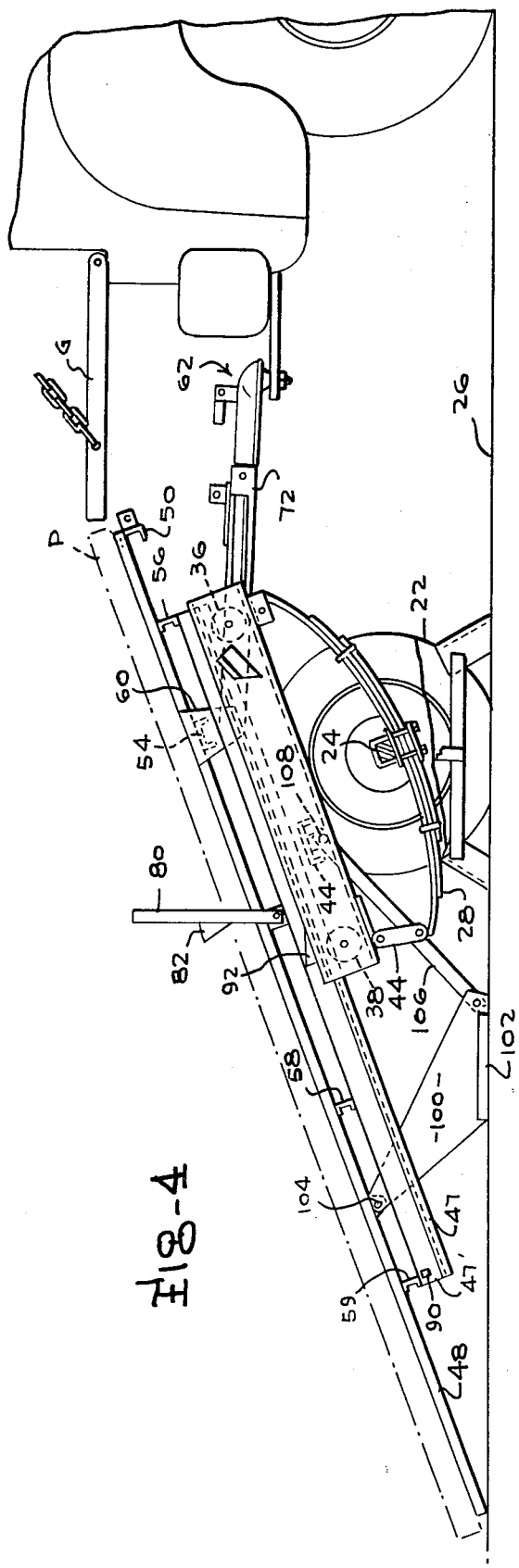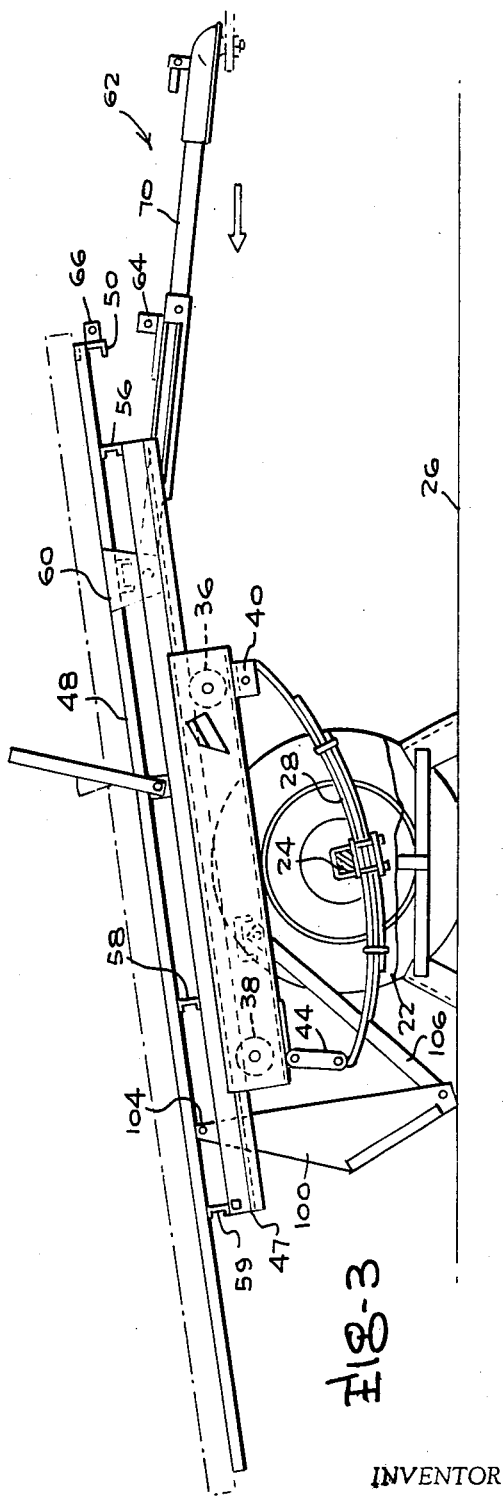

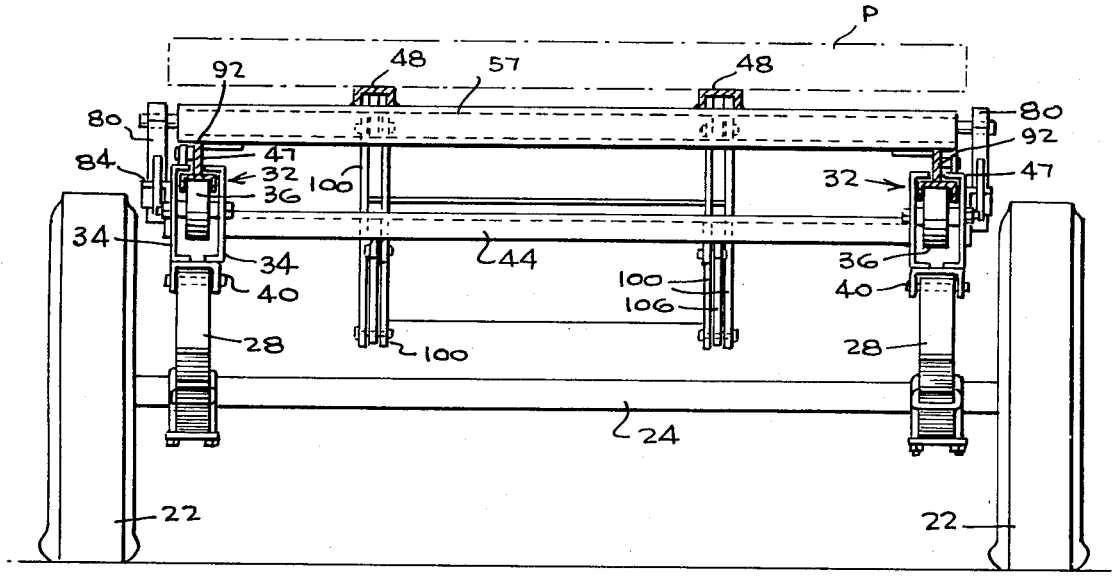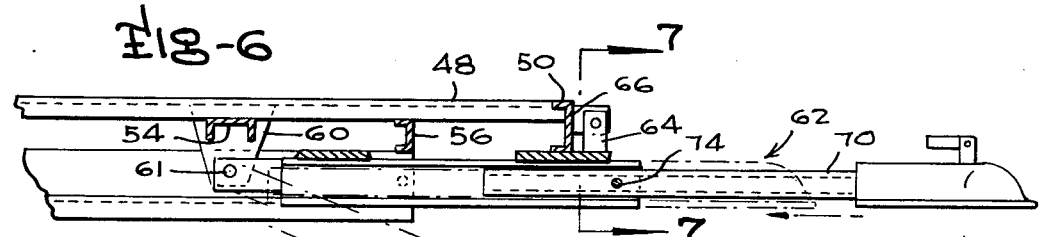

TRAILER CONSTRUCTION

This invention is in the field of towed vehicles and is specifically directed to a trailer construction capable of being towed by an automobile or the like.

A wide variety of trailer constructions have evolved since the advent of the automobile; however, the known trailer designs suffer from a number of disadvantages. For example, width limitations on vehicles used on public roads limit the distance between the wheels of trailers so that the load carrying platform of such trailers must be positioned above the wheels in order to provide a maximum load carrying surface. Such positioning of the load carrying platform above the trailer wheels results in a high elevation of the platform which frequently makes it difficult to load and unload items from the platform. While it is possible to disconnect trailers of this type from the towing vehicle, and pivot the trailer above its axle to lower the rear edge of the platform to ground level, the dimensions of such trailers are such that the platform is at an extremely steep angle with respect to the ground surface at the time the rear edge thereof engages the ground surface. Consequently, unloading or loading by this method is difficult if not impossible.

Other trailer constructions have mounted the load carrying platform below the wheels in order to have the platform at a relatively low level. However, such constructions obviously sacrifice total load carrying capacity due to the reduced area of the load carrying platform necessitated in order to provide clearance with respect to the trailer wheels.

This invention enables the usage of a large platform normally carried above the trailer wheels but which is shiftable rearwardly to pivot its rearmost end downwardly so that upon ground engagement of the rear of the platform, the platform is at a relatively low inclination. Consequently, articles can be removed from the trailer or placed upon the trailer in an easy manner; and the trailer can also operate as a loading ramp for trucks or the like.

Therefore, it is the primary object of this invention to provide a new and improved trailer construction in which optimum load carrying capacity is provided along with optimum ease of loading and unloading of the trailer and to provide a stationary loading ramp.

The manner in which the object of this invention is obtained will be easily understood when the following written description is read in conjunction with the attached drawings in which:

FIG. 1 is a side elevational view illustrating the preferred embodiment in its normal towing position assumed during a towing operation;

FIG. 2 is a plan view of FIG. 1;

FIG. 3 is a side elevational view similar to FIG. 1 but illustrating the trailer in an intermediate position assumed during movement from the towing position of FIG. 1 to a loading/unloading position illustrated in FIG. 4;

FIG. 4 is a side elevational view illustrating the trailer in its loading/unloading position and as a ramp;

FIG. 5 is a sectional view taken along lines 5—5 of FIG. 1;

FIG. 6 is a sectional view taken along lines 6—6 of FIG. 1;

FIG. 7 is a sectional view taken along lines 7—7 of FIG. 6; and

FIG. 8 is a perspective view illustrating wheel locking means employed with the preferred embodiment during movement from a towing position to an unloading/loading position.

Attention is initially invited to FIGS. 1 and 2 of the drawings which illustrate the preferred embodiment, generally designated 20, which includes a pair of conventional wheels 22 mounted on an axle 24 in a conventional manner. Wheels 22 rest upon a supporting surface 26 and a pair of leaf springs 28 (FIG. 5) are connected adjacent their middle portions to the axle 24 adjacent each end of the axle for providing support for a support frame generally designated 30.

The support frame 30 is of unitary construction and is connected to the wheels 22 and axle 24 via the leaf springs 28 to provide an operative mechanical unit with respect to which the remaining portions of the trailer are adjustable forwardly and rearwardly.

Support frame 30 includes first and second box frame members 32 of generally rectangular cross section each formed of a pair of inwardly facing channel members 34 as best shown in FIG. 5. An open space within the confines of the channel members 34 of each of the box frame members 32 provides support for a forward roller member 36 and a rearward roller member 38 which are supported on axle shafts extending between the two channel members 34 of each box frame member.

The forward ends of the channel members 34 are welded to a front bracket 40 to which the forward ends of leaf springs 28 are connected by pivot pin means in a well-known manner. Similarly, a rearward bracket plate 42 is welded to the rearmost lower edges of the channel members 34 and is provided with a pivotal connection to a link 44. Link 44 is connected to the rear end of each of the springs 28.

Box frame members 32 are connected to each other by a main transverse beam 44 weldingly connected to the innermost channel members 34. Therefore, it should be noted that the support frame means constitutes the channel members 34 and the main transverse means 44 all of which are connected in a unitary manner and are connected to the springs 28 both forwardly and rearwardly.

Box frames 32 are connected so that there is a continuous slot along their upper surface created by spacing of the channel components 34 of each box frame a given distance apart. It should be noted that the channel frame members 34 welded to the elements 40 and 42 which maintain the channel components in the fixed space relationship with respect to each other.

A forwardly and rearwardly movable platform supporting frame 46 is provided to be supported by the rollers 36, 38 by means of a pair of track members 47 each of which are of T-shaped cross-sectional configuration and which have a head flange in rolling contact with the top of the rollers. Additionally, each of the tracks 47 includes a vertically extending leg flange 47' extending upwardly through the upper slot defined between the channel members 34 of each of the box frames 32 so that the track members are restricted solely to axial reciprocation and cannot be shifted laterally with respect to the rollers 36, 38.

The upper edge of the vertical flange 47' provides support for a plurality of transversely extending frame members 56, 57, 58 and 59 which are welded or otherwise attached to the upper surface of elements 47'. A pair of longitudinally extending frame members 48 is welded to the upper surface of the transversely extending frame members 56, 57, 58 and 59 with the forward and rearward ends of the frame members 48 being connected by transverse frame members 50 and 52 respectively. In addition, a main internal frame member 54 extends between the lower edge of frame members 48 with depending brackets 60 extending downwardly adjacent the ends of the member 54. Therefore, it will be seen that the movable platform supporting frame generally designated 46 essentially includes the track members 47 and the other components such as 56, 57, 48 etc. connected thereto.

Brackets 60 provide pivotal support for a towing tongue 62 which is pivotally connected at 61 to the bracket for movement in the manner illustrated in FIG. 6. However, it should be noted that the towing tongue 62 is provided with a vertically extending latch plate 64 which has an aperture alignable with a similar aperture in a forwardly extending plate 66 which extends forwardly from the forward channel member 50 as best shown in FIGS. 6 and 7. A pin 68 is inserted through the aligned apertures of the elements 64, 66 for retaining the towing tongue 62 in its upward horizontal position shown in FIGS. 1 and 6.

Additionally, it should be noted that the length of the towing tongue 62 can be adjusted by virtue of the fact that the tongue consists of telescopic members 70, 72 with the parts being held in adjusted lengthwise position by a pin 74. The tongue telescopes out of the way to provide a clear front to the trailer when used as a ramp.

Any conventional load supporting platform such as platform P illustrated in dotted lines in the drawings can be supported from the elements 48, 56 etc. comprising the platform supporting frame 46. The platform supporting frame 46 is reciprocable with respect to the rollers 36, 38; however, the frame is shown in its forward position in FIG. 1 and can be held in this position by means of a pivotal latch bar 80 mounted for pivotal movement adjacent each end of the frame component 57 and having a locking plate 82 extending downwardly from its lower surface as shown in FIG. 1. Locking plate 82 is engageable with a stop member 84 extending outwardly from each side of the box frame members 32 as shown in FIGS. 2 and 5.

Additionally, a stop lug 90 is provided to extend outwardly from a point adjacent the rearmost end of the vertical flange 47' of the track 47 as shown in FIG. 4 to engage a fixed stop 92 extending upwardly from the upper surface of the outer channel members 34 of each of the box frame members 32. Consequently, the engagement of the elements 90, 92 as shown in FIG. 1 limits the extent of forward movement of the shiftable platform supporting frame member 46 while the latch members 80, 84 etc. holds the shiftable platform supporting frame 46 in its forwardmost position. The levers 80, etc. are preferably mounted on a common shaft extending the width of the frame 46 as shown in FIG. 2 to enable simultaneous operation of both levers 80 in an obvious manner.

In addition, an intermediate bracing means comprising triangular plates 100 welded to a base plate 102 is pivotally connected to the platform frame 46 at pivot points 104 with a connecting link 106 extending between the upper end of the plates 100 and a pivot point 108 immediately beneath the frame member 44.

During normal hauling operations, the inventive construction is retained in the condition illustrated in FIG. 1 in which the tongue 62 is latched in its upright position by the pin extending through members 64, 66. In the aforementioned position, the platform support frame 48 is horizontally oriented above the wheels.

Should it be desired to lower the platform, for either loading or unloading, wheels 22 are locked by brakes if the trailer has such and if there are no brakes, a simple wheel lock 120 comprising first and second wheel engaging angle members 122, a horizontal member 124 and a vertical brace 126 is engaged with each of the wheels in an obvious manner as shown in FIGS. 3, 4 and 8. Consequently, the wheels are incapable of rolling movement. The latch pin engaging elements 64, 66 are then removed so that the tongue 62 is free to pivot about pivot pins 61. Latch lever 80 is then lifted upwardly from the position shown in FIG. 1 to the position shown in FIGS. 3 and 4. At this time, the towing vehicle backs up providing the power required to convert trailer into ramp. If there are articles to be loaded or unloaded directly from the towing vehicle itself, then latch pin 74 is removed, the towing vehicle backs up again a short distance, which telescopes the tongue, and allows the towing vehicle to approach very close to the front of the trailer/ramp to facilitate loading or unloading from the towing vehicle. It should be understood that the initial backing up of the towing vehicle causes the springs 28, support frame 30 and the elements supported thereon to rotate counter-clockwise about the axis of axle 24 until the ends of the triangular plates 100 engage the supporting surface 26 in the manner shown in FIG. 3. Simultaneously, the track members 47 move rearwardly to the left as viewed in FIG. 3 and this movement continues until the base plate 102 is in solid engagement with the supporting surface 26 and the rear end of the frame members 48 and platform P similarly engage the surface 26 as shown in FIG. 4. In this condition, the platform is oriented at a low angle with respect to the surface 26 and items can be easily removed from or placed upon the platform in an obvious manner.

Attention is invited to FIG. 4 of the drawings which illustrates a typical manner of usage in which a tailgate G of the towing vehicle is lowered into alignment with the forward surface of the load carrying platform of the trailer to enable an easy loading or unloading of items on the towing vehicle. However, in some circumstances, the towing vehicle will not be provided with a tailgate in the manner shown in FIG. 4. In such cases, the trailer is used as a ramp by pivoting the towing tongue downwardly to permit the rear edge of the towing truck to be backed up immediately adjacent the forward edge of the trailer in an obvious manner.

The trailer is returned to its traveling condition illustrated in FIG. 1 by simply moving the tongue 62 to the right from the FIG. 4 position to cause the tracks 47 to roll over rollers 36, 38 until stop 90 engages the abutment 92. At this time, the latch members 80, 82 are rotated downwardly to engage the latch lug 84 to maintain the parts in their traveling condition illustrated in FIG. 1 and the tongue 62 is similarly latched in its horizontally extending position by means of the pin extending through elements 64, 66.

Therefore, it will be seen that the subject invention provides an easy to use construction providing a great improvement in the loading and unloading of articles. Many modifications will occur to those skilled in the art; however, it should be understood that the spirit and scope of the invention should be limited solely by the appended claims.

I claim:

1. A trailer comprising first and second wheels connected by a common axle, support frame means supported by said axle, a shiftable platform frame for supporting a planar load platform on its upper surface, pivotable means connecting the rearmost end of a towing tongue means to a forward portion of said platform frame means, tongue latching means for latching said tongue in position extending substantially parallel to said platform frame, roller means mounting said platform frame on said support frame for movement between a forward position in which a major portion of said platform frame is positioned forwardly of said axle and a rearward position in which a major portion of said platform frame extends rearwardly of said axle whereby said platform frame is pivotable downwardly to engage its rearmost edge with a supporting surface with the angle of inclination between the platform frame and the supporting frame being substantially less when said platform frame is in its rearward position than would be the case with the platform frame in its forward position to consequently enable an easy loading and unloading of objects carried by said platform frame, latch means for retaining said platform frame in its forward position, intermediate brace means pivotally connected to a rearward portion of said platform frame and a linkage means connecting said brace means to said support frame for moving a portion of said brace means into engagement with the supporting surface in response to movement of said platform frame to its rearward position concurrently with pivotal movement of said support frame about the axis of said axle, so that said intermediate brace means provides support for said platform frame intermediate the rearmost end edge of said platform frame and the engagement point between said platform frame and said roller means and abutment means on said support frame and stop means on said platform frame engageable with said abutment means for limiting the forward position of said platform frame with respect to said support frame.

2. The invention of claim 1 wherein said box frame members are respectively connected at each end to the ends of leaf spring means medially connected to said axle member.

3. The invention of claim 2 wherein the rearmost ends of said box frame members are connected to the rearmost ends of said leaf spring means by a pivotal link member.

* * * * *